United States Patent
Sato (10) Patent No.: US 6,681,055 B1
(45) Date of Patent: Jan. 20, 2004

(54) FORMATION METHOD OF TWO-DIMENSIONAL CODE

(76) Inventor: Kazuo Sato, 1001-128, Aza Mura-higashi, Oaza Iidera, Mondenmachi, Aizuwakamatsu-shi, Fukushima 965-0846 (JP)

( * ) Notice: Subject to any disclaimer, the term of this patent is extended or adjusted under 35 U.S.C. 154(b) by 0 days.

(21) Appl. No.: 09/489,848

(22) Filed: Jan. 24, 2000

(30) Foreign Application Priority Data

Jan. 28, 1999 (JP) .............................. 11-19193

(51) Int. Cl.$^7$ .................. G06K 9/40; G06K 19/06; G06K 1/00; B41J 2/47
(52) U.S. Cl. ................. 382/275; 382/268; 382/269; 235/494; 347/254; 358/1.2
(58) Field of Search ................. 382/237, 266, 382/267, 268, 269, 275; 235/462.09, 494; 347/254; 358/1.2

(56) References Cited

U.S. PATENT DOCUMENTS

| | | | |
|---|---|---|---|
| 5,105,280 A | * | 4/1992 | Ogino et al. ............... 358/3.07 |
| 5,313,564 A | * | 5/1994 | Kafri et al. ................... 358/1.1 |
| 5,446,550 A | * | 8/1995 | Maekawa et al. .......... 358/3.19 |
| 5,640,191 A | * | 6/1997 | Zulian et al. ................ 347/247 |
| 5,734,390 A | * | 3/1998 | Sakaizawa et al. ............ 347/2 |
| 6,121,574 A | * | 9/2000 | Xu ........................ 219/121.69 |
| 6,266,079 B1 | * | 7/2001 | Gershony et al. ........... 347/251 |

* cited by examiner

*Primary Examiner*—Wenpeng Chen
(74) *Attorney, Agent, or Firm*—Ronald R. Snider (57) ABSTRACT

A formation method of a two-dimensional code is characterized by including the steps of: storing each cell having a bright pattern or a dark pattern as 0 or 1 in a two-dimensional array after reading a bit map file; calculating a number of round dots contained in a cell from the size of one cell to be laser-marked and a processed diameter of a round dot formed by a laser beam according to material processed; obtaining a processed area from the two-dimensional array stored and the size of one cell; setting a plurality of cell frames in a checked pattern with this center point as a base; arranging the round dots in equal intervals in the cell frames; storing in memory the coordinates of beam spots corresponding to the respective round dots arranged; and outputting process data stored in this memory to a laser marker and performing laser-marking.

3 Claims, 12 Drawing Sheets

FORMATION METHOD OF TWO-DIMENSIONAL CODE

BACKGROUND OF THE INVENTION

1. Field of the Invention

The present invention relates to a formation method of a two-dimensional code by means of laser burning.

2. Description of the Prior Art

Generally, bar codes composed of printed stripes are used on packages of goods for merchandise control and accounting at a point of sales. Nevertheless, this bar code composed of stripes has a small amount of data to be recorded in comparison with an area to be used, and hence can be used only for control of article numbers of goods and the like.

For this reason, recently, a two-dimensional code that is formed by a matrix having a bright and dark dotted pattern has been used. Since this code can record 12 alphanumeric characters per 1 m square, the data amount per unit area is extremely large in comparison with that of the bar code. Therefore, this code has such advantages that the code can not only record plenty of data but also read the data from any direction, that is, the direction of 360° with a reader. Furthermore, since this code not only has a function of recovering data even if a part of the code is damaged or stained, but also can secretly manage information by encrypting data, its application has been widespread.

When this two-dimensional code is generated, image data composed of a matrix having a bright and dark pattern is generated on a screen of a personal computer with using a graphic software. Conventionally, a two-dimensional code is formed on a marking surface with a method such as presswork, printing with a printer, and laser burning on the basis of a two-dimensional code generated from this image data.

Figure 23:
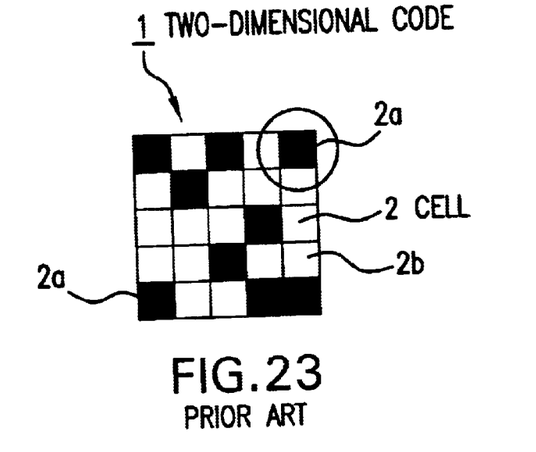
FIG. 23 is a top view showing a conventional two-dimensional code.

A two-dimensional code 1, as shown in FIG. 23, records data by forming a plurality of cells 2 through dividing an inside of a square or a rectangle into a matrix, and arraying cells 2a, which are derived from cells 2 and are darkly filled, and bright cells 2b. For example, if 25 pieces of square cells 2 are formed by dividing a two-dimensional code 1, having an area of 1.2 mm square, into squares with 5 rows and 5 columns, each cell 2 is formed in the shape of a square each side of which is 240 μm long.

Figure 24A:
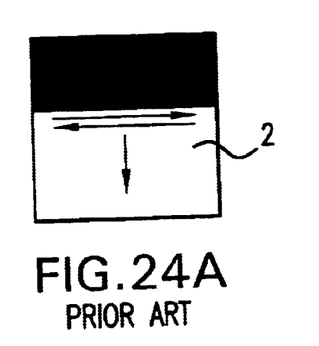
FIGS. 24(A) and (B) is an explanatory diagram showing a method for finally forming a cell, darkly filled, by linearly burning a processed area downward in order with scanning a conventional laser beam from side to side.
Figure 24B:
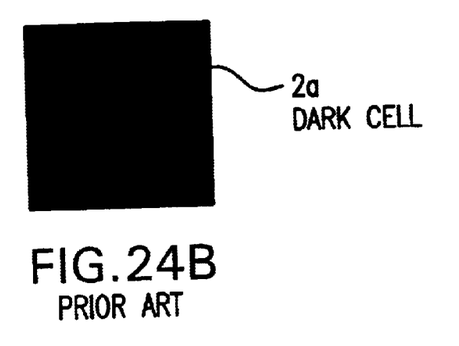

When a cell 2a, which is darkly filled, is formed on a marking surface of metal, resin, or the like with heat of a laser beam by irradiating the laser beam on the marking surface, first, as shown in FIG. 24A, a cell 2 is linearly burnt with the laser beam sequentially from an upper portion to a lower portion with making the laser beam horizontally scan. Finally, as shown in FIG. 24B, the dark cell 2a is formed by burning the marking surface in a square totally.

Figure 25:
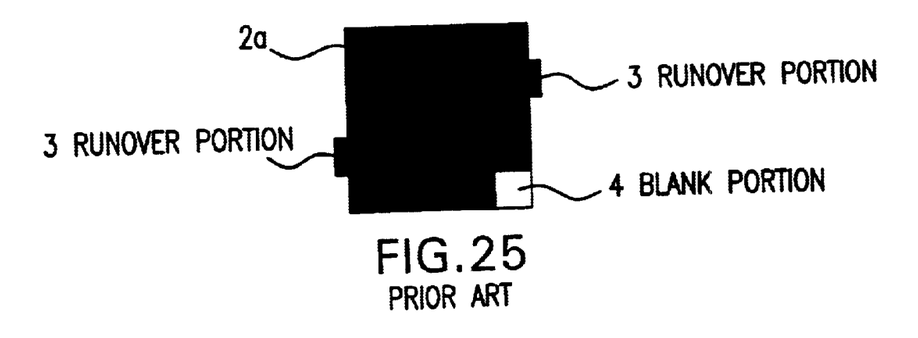
FIG. 25 is a top view of a dark cell that is formed with a conventional method and has a blank portion and runover portions.
Figure 26:
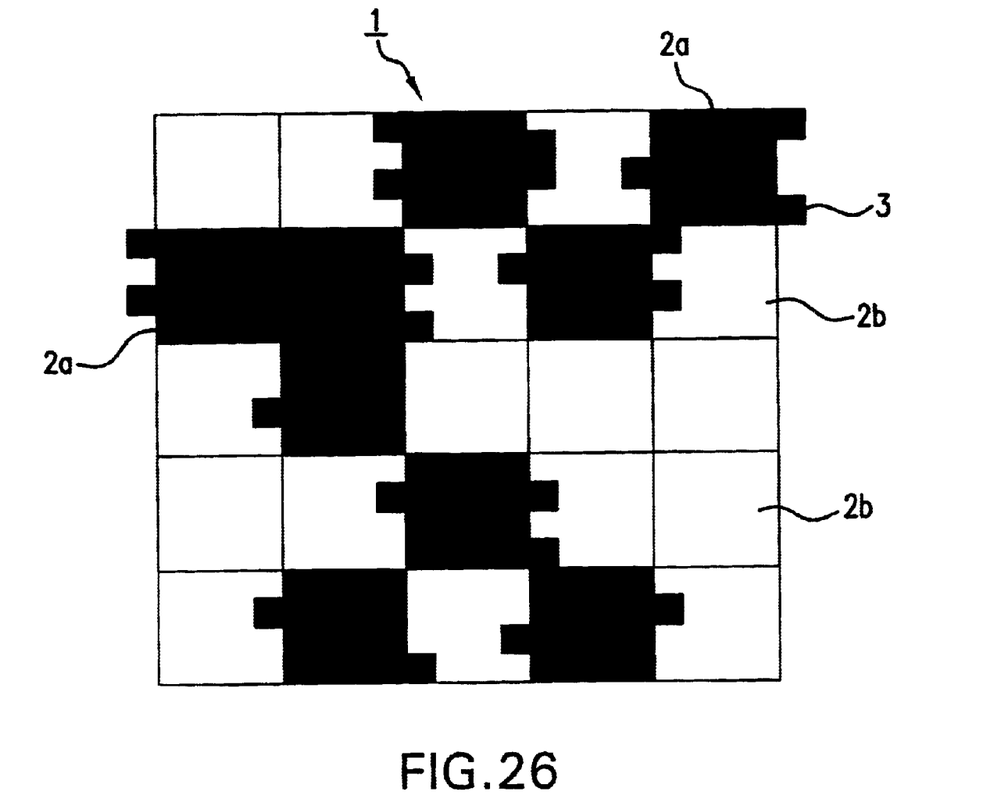
FIG. 26 is a top view of a two-dimensional code formed with cells having runover portions and blank portions due to a conventional method.

In this system, since there is no regularity in radiation intervals of a laser, the laser beam may be irradiated out of a cell area, and hence, for example, as shown in FIG. 25, runover portion 3, caused by the laser beam deviating horizontally, and a blank portion 4 may arise in some cases. If a two-dimensional code 1 including such irregular cells 2a is formed on a marking surface as shown in FIG. 11, this causes a problem that the code may be read as erroneous data by a reader. In particular, in case of a minute two-dimensional code with only an area of 1 mm square, read errors increase, and hence this causes a problem that an advantage of the two-dimensional code which can record plenty of information is extinguished.

This is because it is not defined in a conventional system that vector data necessary for forming a cell exists only in a cell area. Thus, the conventional system does not recognize each of 25 cells, formed in a matrix with 5 rows and 5 columns, as a unit cell, but generates the two-dimensional code by sequentially combining line-drawing continuous data in bit-map data on the basis of image data. Therefore, a coordinate management system of recognizing a starting point and an end point of marking is not adopted, and hence this causes a problem that irregular cells are formed.

In addition, in a conventional formation method of a two-dimensional code with using a bit map data, there is such a problem that a two-dimensional code cannot be marked on a work whose area is small since the size of an area where the code is formed is predetermined. In particular, when a two-dimensional code is formed by laser burning, there is such a problem that, since a diameter of a laser beam is different from a diameter of a round dot processed every material to be processed, a high-precision two-dimensional code cannot be formed. In addition, the formation method of a two-dimensional code with using a bit map data has such a problem that it is difficult to store large volume of data due to necessity of large memory capacity. Furthermore, if two-dimensional codes are formed with using bit map data different every company, each laser marker dedicated to each company should be used.

BRIEF SUMMARY OF THE INVENTION

Object of the Invention

The present invention can remove the above disadvantages. Thus, the present invention provides a formation method of a two-dimensional code that can save memory capacity for process data by replacing one cell with one bit, and can increase read precision by forming the two-dimensional code on a marking surface in high precision with accommodating positions of laser beam spots to process material through coordinate management. In particular, this method is effective for two-dimensional code configured by minute cells.

SUMMARY OF THE INVENTION

A formation method of a two-dimensional code according to a first aspect of the present invention is a method for forming the two-dimensional code, where unit cells each of which is in a dark or bright pattern are arranged in a matrix, on a marking surface by laser burning, the method comprising the steps of storing a bright or dark cell as an element of a two-dimensional array having a value of 0 or 1 after reading a bit map file, calculating a number of round dots contained in a cell from the size of one cell to be laser-marked and a processed diameter of a round dot formed by a laser beam according to material processed, obtaining a processed area from the two-dimensional array, which is stored and is configured by zeroes and ones, and the size of one cell, setting a plurality of cell frames at intervals of one cell width in the X and Y directions in a checked pattern with a center point of this processed area as a base, arranging the round dots inside corners of the cell frames so that the round dots may be inscribed in the corners and arranging the round dots at equal intervals between the round dots inscribed in the corners, storing in memory the coordinates of beam spots corresponding to centers of the respective round dots arranged in the processed area, and outputting this process data stored in the memory to a laser marker and performing laser-marking on the marking surface.

In addition, a formation method of a two-dimensional code according to a second aspect of the present invention is characterized in that, in the step of storing a bright or dark cell as an element of a two-dimensional array having a value of 0 or 1 after reading a bit map file, if a dark pattern or bright pattern in the bit map file is configured by rectangular cells each of which is configured by a plurality of bunching square cell elements, each cell is stored as an element of a two-dimensional array having a value of 0 or 1 after reading only one cell element in each cell.

Furthermore, a formation of a two-dimensional code according to a third aspect of the present invention is characterized in that, in the step of storing coordinates of beam spots, which correspond to centers of respective round dots arranged in a processed area, in memory, only beam spot coordinates of dark cells are stored in memory.

DETAILED DESCRIPTION OF THE PREFERRED EMBODIMENTS

Figure 1:
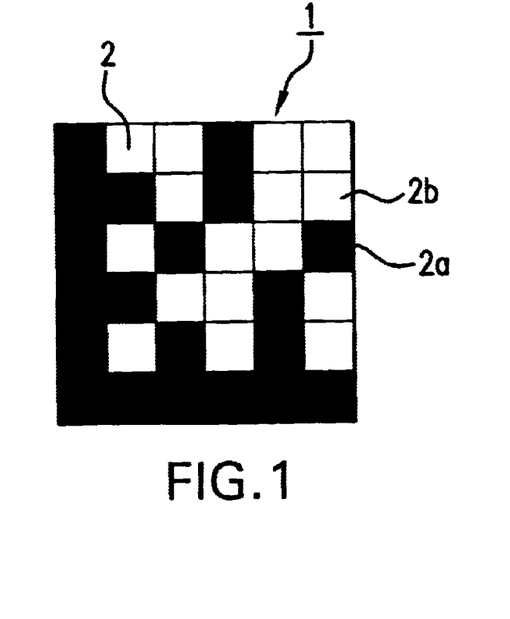
FIG. 1 is a top view showing a two-dimensional code with using a bit map file.
Figure 2A:
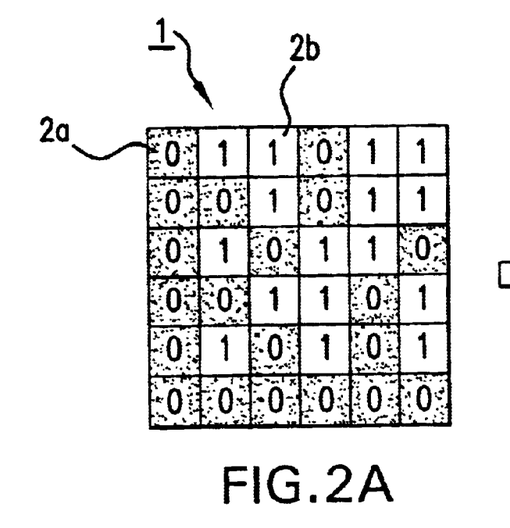
FIG. 2A is a explanatory diagram where a dark cell 2a in the two-dimensional code shown in FIG. 1 corresponds to 0 and a bright cells 2b does 1.
Figure 2B:
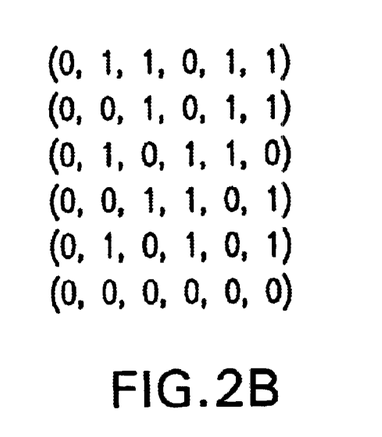
FIG. 2B shows code data where zeros and ones that are read from FIG. 1 are arrayed in a two-dimensional matrix.

Hereinafter, an embodiment of the present invention will be described in detail with reference to FIG. 1 to FIG. 19. As shown in FIG. 1, a two-dimensional code 1 is outputted as a bit map file where dark cells 2a's and bright cells 2b's are arranged in a matrix. In regard to this two-dimensional code 1 outputted as the bit map file, as shown in FIG. 2A, a dark cell 2a is made to correspond to 0, and a bright cell 2b is made to do 1. As shown in FIG. 2B, these are stored as code data in a two-dimensional matrix configured by zeroes and ones. In this case, guide cells and data frames also are recognized as dark aggregates. Since a reactive value to a laser is different according to material to be marked, a diameter of a round dot formed is different every material even if a laser beam having eh same diameter and same power is emitted. For example, assuming a diameter of a laser beam is 30 μm, a diameter of a round dot formed by burning becomes 50 μm. For this reason, a processed diameter of a round dot is calculated beforehand according to a kind of material to be marked. In addition, a user determines the size of one cell. Thus, the user determines the size of a processed area that is an aggregate of cells, that is, the size of the two-dimensional code according to the size of a marking surface of the material is to be marked.

Figure 3:
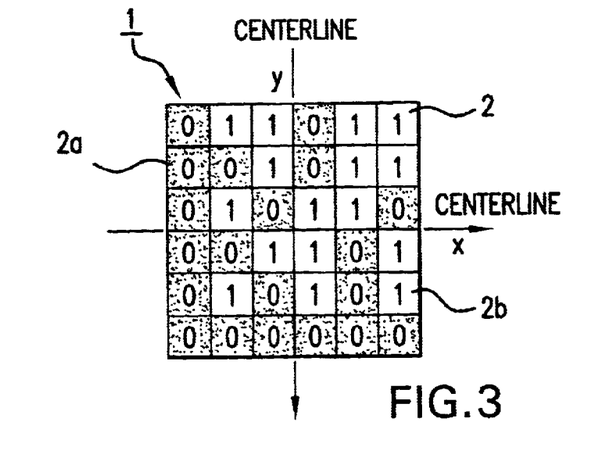
FIG. 3 is an explanatory diagram showing an array of a two-dimensional code configured by dark cells 2a's and bright cells 2b's.
Figure 4:
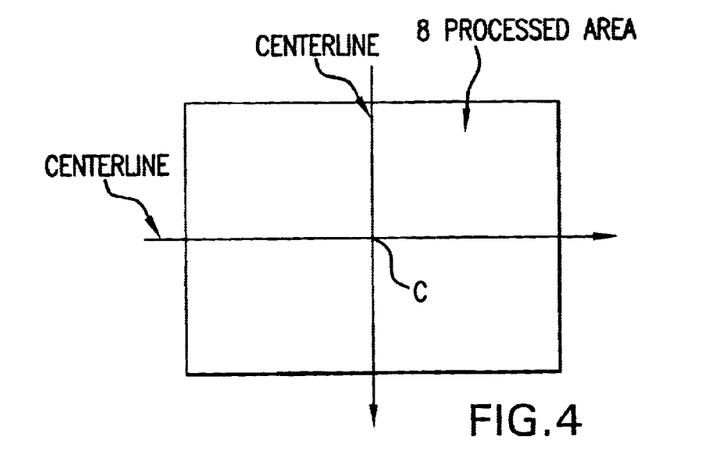
FIG. 4 is an explanatory diagram showing a processed area.

Next, each of zeros and ones arrayed in the two-dimensional matrix as shown in FIG. 2B is recognized as a cell, and an entire processed area is determined from the size of one cell determined by the user. If a plurality of cells 2's is arranged in this processed area, the plurality of cells 2's is arranged so that a centerline of the plurality of cells 2's may coincide with a centerline of the processed area. Thus, if an even number of cells 2's, for example, 6×6 cells are arranged as shown in FIG. 3, a boundary line between two sets of three cells is made to be the centerline. Then this centerline is made to coincide with a centerline of a processed area 8 shown in FIG. 4.

Figure 5:
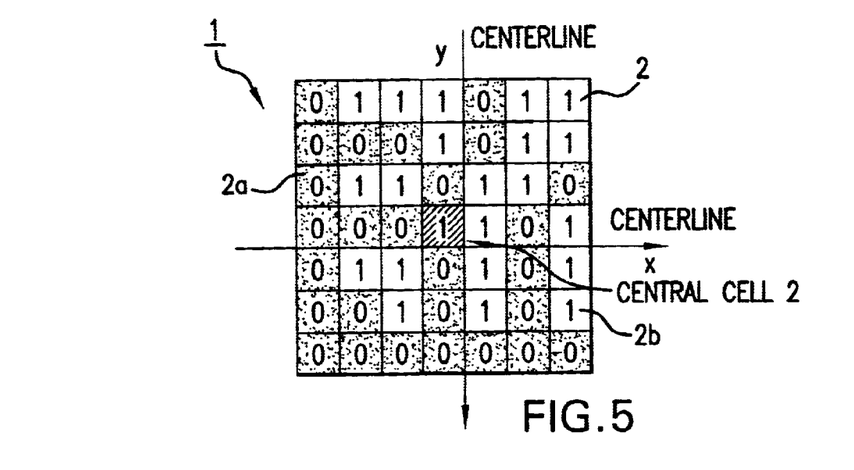
FIG. 5 is an explanatory diagram showing a two-dimensional code where an odd number of cells are arrayed.
Figure 6:
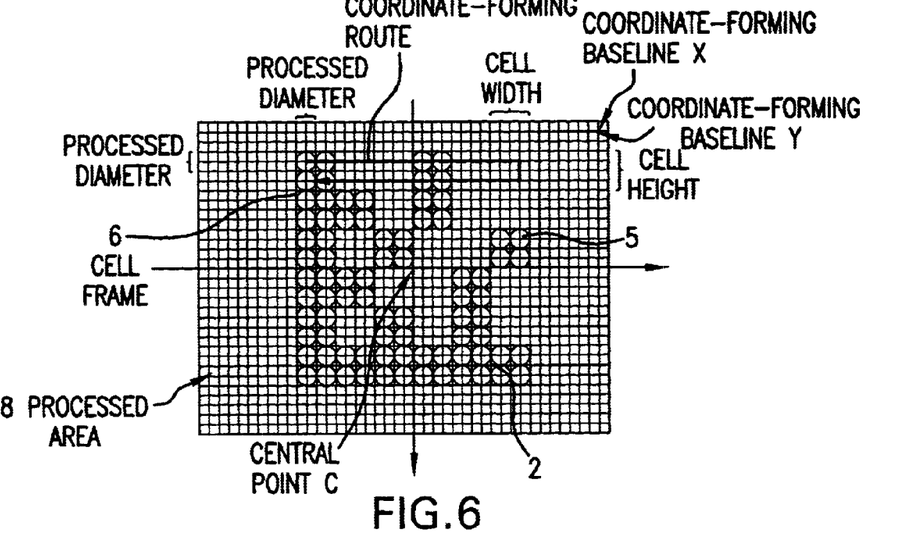
FIG. 6 is an explanatory diagram showing such a state that a cell frame is formed in a processed area and round dots are arranged therein.

In addition, if an odd number of cells 2's, for example, 7×7 cells are arranged as shown in FIG. 5, a boundary line between the fourth cell and fifth cell is made to be a centerline. Then, this line is made to coincide with the centerline of the processed area 8 shown in FIG. 4. Next, an intersection of vertical and horizontal centerlines of the processed area 8 shown in FIG. 6 is made to be a central point C. Then, with this as a base, a plurality of cell frames 6's are set in a checked pattern at intervals of one cell in the X and Y directions so as to arrange cells 2's, whose size is determined by the user, in the vertical and horizontal directions.

Figure 7:
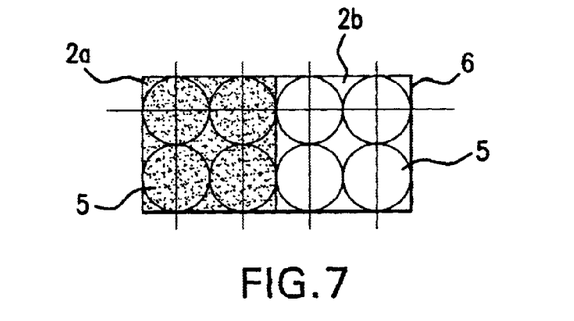
FIG. 7 is an explanatory diagram showing under magnification a principal part of the processed area shown in FIG. 6.

In addition, a number of round dots arranged in one cell is determined from the size of the cell 2 that is determined by the user and the processed diameter of a round dot 5 formed according to kinds of raw material. When the width of one cell (cell width) is an integral multiple of the processed diameter of the round dot 5 laser-marked, for example, when round dots 5's with 2 rows by 2 columns are just contained in one cell as shown in FIG. 7, the round dots with 2 rows by 2 columns, that is, four round dots 5's form one cell.

Figure 8:
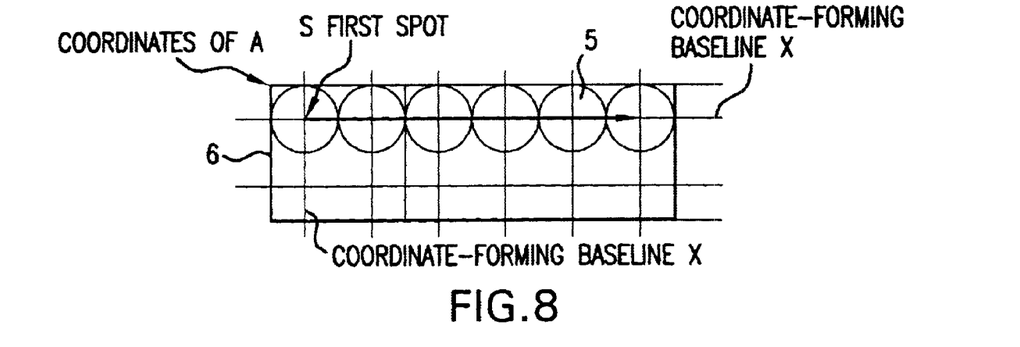
FIG. 8 is an explanatory diagram showing under magnification a corner of the processed area shown in FIG. 6.

Next, the round dots 5's are arranged in the cell 2 with the central point C, which is an intersection of the vertical and horizontal center lines of the processed area shown in FIG. 6, as a base. In this method, as shown in FIG. 6, it is assumed that the coordinate value of the top left corner of the processed area 8 is A. It is assumed that a position obtained by shifting the coordinate value A by process radius of the round dot 5 in the X and Y directions respectively toward the inside of the processed area 8 as shown in FIG. 8 is a first beam spot coordinate point S. Furthermore, it is assumed that a line that is parallel to the X-axis and passes over the first beam spot is a coordinate-forming baseline X. Then, plenty of coordinate-forming baselines X's parallel to this baseline are formed at intervals of the processed diameter of the round dot 5. Similarly, it is assumed that a line that is parallel to the Y-axis and passes over the first beam spot is a coordinate-forming baseline Y. Then, plenty of coordinate-forming baselines Y's parallel to this baseline are formed at intervals of the processed diameter of the round dot 5.

An intersection of the coordinate-forming baseline X and coordinate-forming baseline Y that are formed in this manner become a beam spot. Therefore, as shown in FIG. 8, a coordinate value of an intersection adjacent to the first beam spot S is obtained as a next beam spot coordinate value in the horizontal direction. This is repeated until beam spot coordinate values are obtained in the entire processed area. In this case, regardless of dark cells 2a's and bright 2b's, beam spot coordinate values in the entire processed area are obtained.

Figure 9:
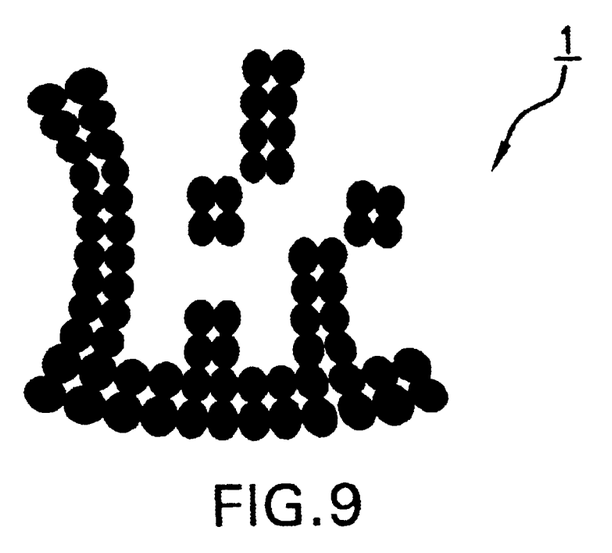
FIG. 9 is a top view of a two-dimensional code being bent.
Figure 10:
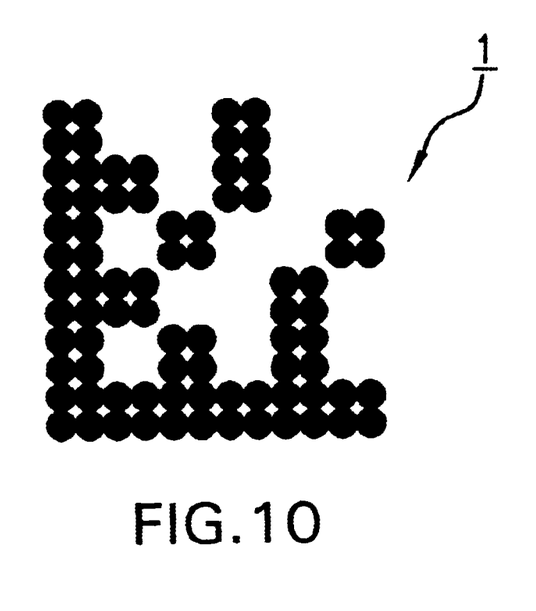
FIG. 10 is a top view of a two-dimensional code laser-marked according to the present invention.

Next, a beam spot coordinate values of only the dark cells 2a's (0) are stored in memory from the beam spot coordinate values, and the code data in the two-dimensional array configured by zeroes and ones as shown in FIG. 2B. Elements of the two-dimensional array of the round dots 5's where beam spot coordinate values are stored in such order that a galvanometer scans the cells 2's. If laser burning is performed on a marking surface with using this process data, which is stored in the memory, as it is, the marking is deformed as shown in FIG. 9. Therefore, the process data is corrected by spherical corrective processing so that a finished form may become square as shown in FIG. 10.

After this, the process data stored in the memory is outputted to a laser marker on the basis of an I/O board specification and a FIFO specification. A laser beam is emitted on the marking surface to form the two-dimensional code 1 shown by dark cells 2a's in FIG. 10.

In addition, such a case that the cell width is an integral multiple of the processed diameter of the round dot 5 is described in the above description.

Figure 11A:
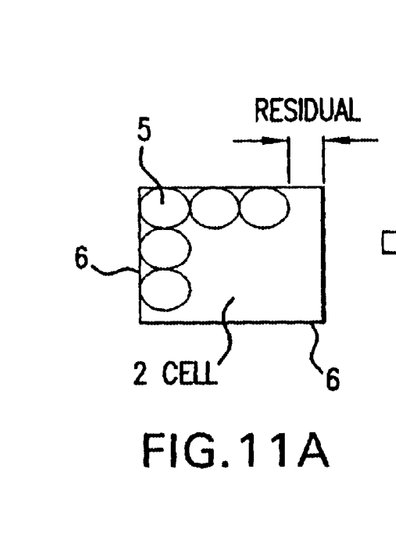
FIGS. 11A to 11C are explanatory diagrams showing such states that round dots are arranged in respective cells with adjusting gaps of the round dots.
Figure 11B:
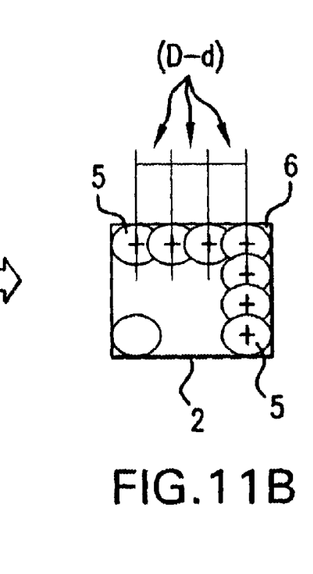

Nevertheless, in some cases, the size of the cell 2 that a user determines, that is, the cell width is not an integral multiple of the processed diameter of the round dot 5 that is determined with a kind of material to be marked. For example, as shown in FIG. 11A, if a residual arises because only three round dots 5's can be arranged, first, as shown in FIG. 11B, the round dots 5's are arranged inside respective corners of the cell frame 6 so that each round dot 5 may be inscribed in the cell frame 6.

Figure 11C:
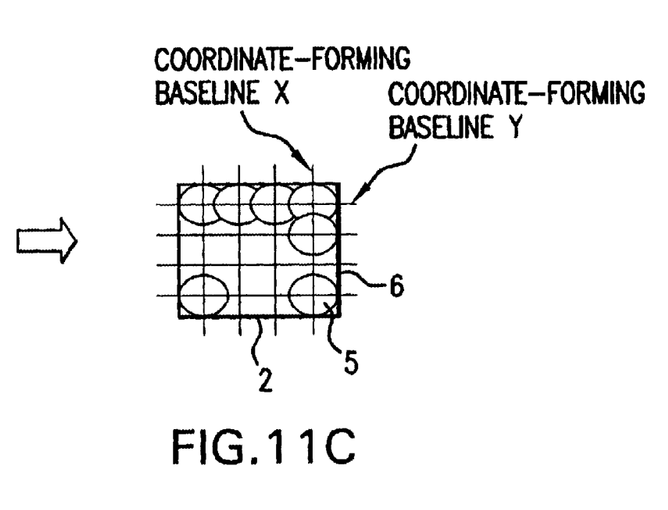
Figure 12:
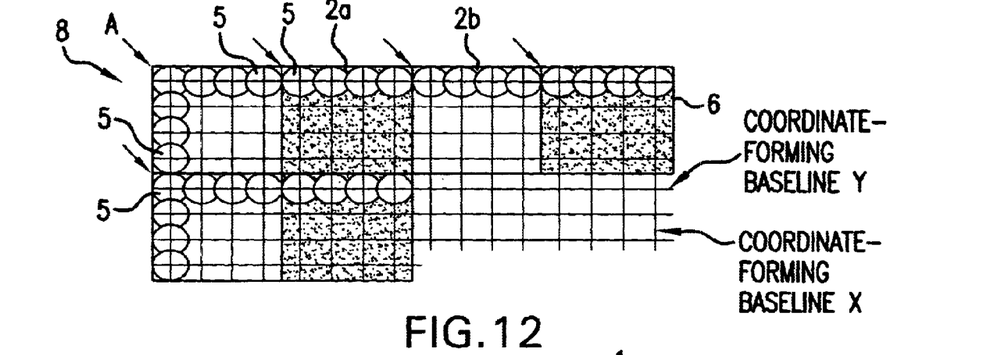
FIG. 12 is an explanatory diagram showing a processed area where round dots are arranged in cells with adjusting gaps of the round dots.

Next, each sets of two round dots 5's are arranged in equal intervals of (D–α) between the round dots 5's at both corners of the cell frame 6 in the horizontal and vertical directions respectively. Next, a line that is parallel to the X-axis and passes on the first beam spot S shown in FIG. 11C is made to be a coordinate-forming baseline X. Other coordinate-forming baselines X's are formed in parallel to the first coordinate-forming baseline X at the intervals of (D–α) that is a gap between round dots 5's adjacent to each other in the horizontal direction in the cell 2. In addition, an interval between the coordinate-forming baselines X's of the round dots 5's inscribed in the cells 2's adjacent to each other in the horizontal direction is the processed diameter D of the round dot 5 as shown in FIG. 12. Similarly, a line that is parallel to the Y-axis and passes on the first beam spot S is made to be a coordinate-forming baseline Y. Other coordinate-forming baselines Y's are formed in parallel to the first coordinate-forming baseline Y at the intervals of (D–α) that is a gap between round dots t's adjacent to each other in the vertical direction in the cell 2. In addition, an interval between the coordinate-forming baselines Y's of the round dots 5's inscribed in the cells 2's adjacent to each other in the vertical direction is the processed diameter D of the round dot 5.

Figure 13A:
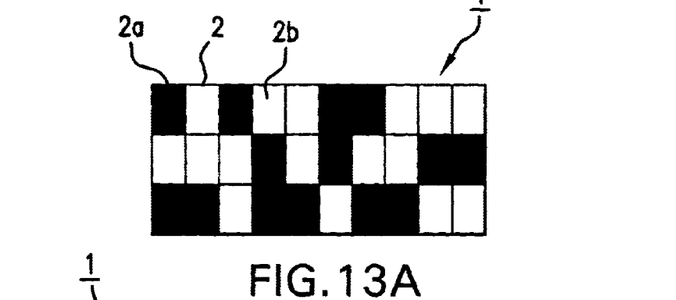
FIG. 13A is a top view showing a stacked two-dimensional code.
Figure 14:
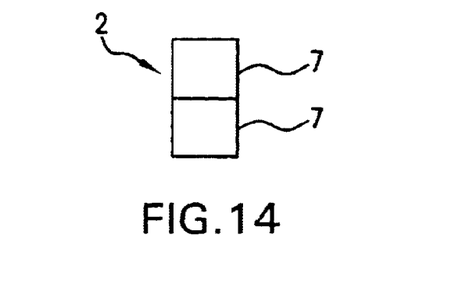
FIG. 14 is an explanatory diagram showing a cell configured by 2 cell elements.

FIG. 13A shows another embodiment of the present invention in a case of forming a stacked two-dimensional code (PDF417). In the stacked two-dimensional code 1, one cell has a rectangular shape and is in a bright or dark pattern. The width of the cell 2 along the X-axis is an integral multiple of the side length of the rectangular or square cell 2. In addition, the length of the cell 2 along the Y-axis is several times the side length of square standard cell element 7 as shown in FIG. 14.

Figure 13B:
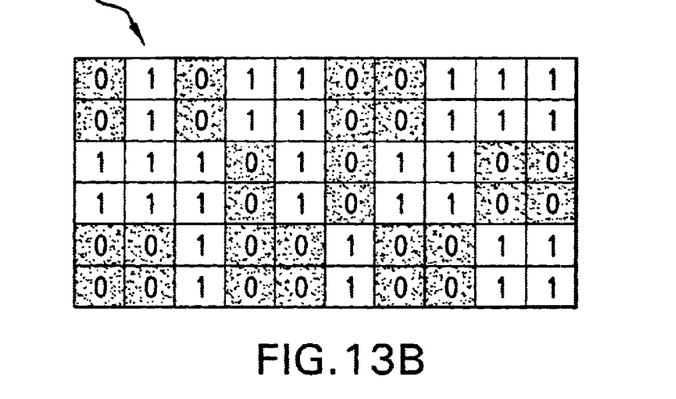
FIG. 13B is an explanatory diagram of this two-dimensional code where a dark cell corresponds to 0 and a bright cell does 1.
Figure 15:
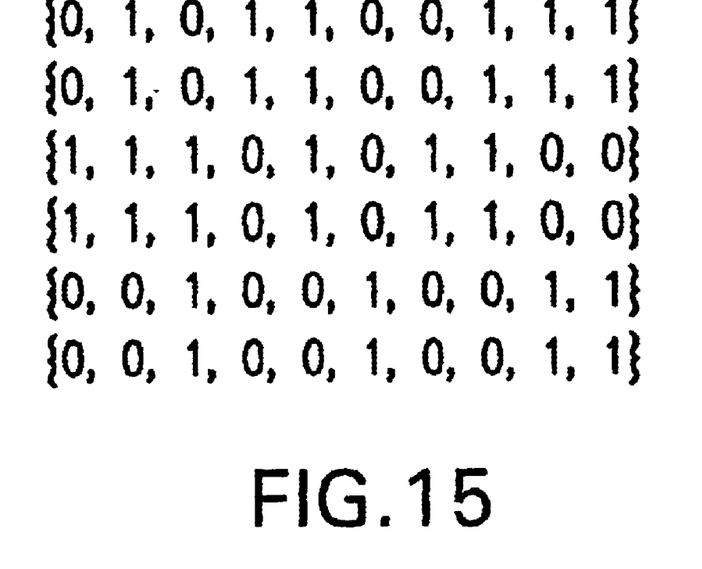
FIG. 15 shows code data where zeros and ones are arrayed in a two-dimensional matrix.

As shown in FIG. 13A, the stacked two-dimensional code 1 is outputted as a bit map file where each cell 2 has a rectangular dark or bright pattern. Therefore, assuming each cell 2 is two times the square cell element 7, as shown in FIG. 13B, the contents of the stacked two-dimensional code 1 is stored by the unit of the cell element 7 as code data arrayed in a two-dimensional matrix configured by zeroes and ones as shown in FIG. 15 after replacing the dark and black patterns with zeroes and ones and reading them. In this case, the cell elements 7's of the cell 2 in the vertical direction is arrayed in the same arrangement along the X-axis. Hence it is possible to replace one cell with one dot by omitting the cell elements 7 in the lower side, reading only the cell elements 7 in the upper side, and storing the cell elements as the code data in the two-dimensional matrix array configured by zeroes and ones. Owing to this, it is possible to save a half of memory capacity for the code data. Similarly, if the cell 2 is formed with four cell elements 7, it is possible to save three fourth of memory capacity for the code data.

Since a reactive value to a laser is different according to material to be marked, a diameter of a round dot formed is different every material even if a laser beam having the same diameter and same power is emitted. Therefore, similarly to the above description, a processed diameter of each round dot according to a kind of material to be marked is measured beforehand. In addition, a user determines the size of one cell according to the size of a marking surface of the material.

Figure 17:
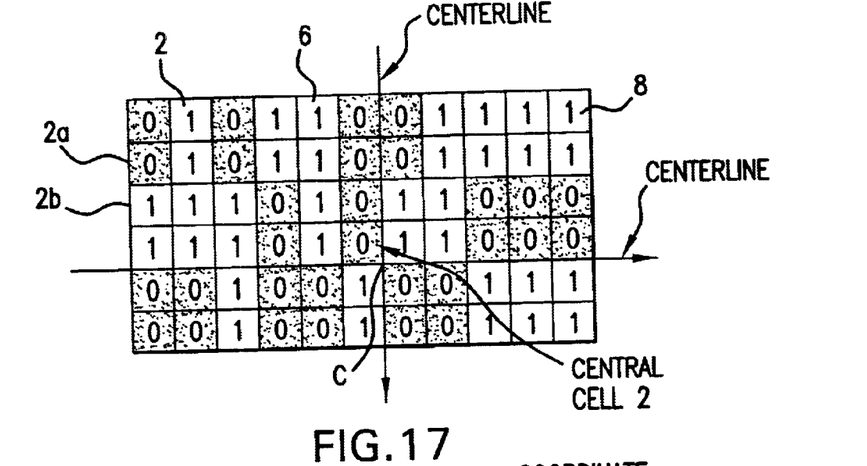
FIG. 17 is an explanatory diagram showing an array of dark cells and bright cells in a two-dimensional code.

Subsequently, each of zeroes and ones of the code data arrayed in the two-dimensional matrix shown in FIG. 13B is recognized as one cell, and the entire processed area 8 is determined from the size of one cell determined by the user as shown in FIG. 17. A plurality of cells 2's are arranged in this processed are 8 so that a center line of the plurality of cells 2's may coincide with a center line of the processed area 8.

In addition, when an odd number of cells 2's, for example, cells 2's with 3 rows×11 columns are arranged as shown in FIG. 17, a boundary line between the second and third cells is made to be the center line of the processed area 8 in the vertical direction, and a boundary line between the sixth and seventh cells is made to be the center line in the horizontal direction. Next, as shown in FIG. 17, an intersection of the vertical and horizontal centerlines of the processed area 8 is made to be a central point C.

With this point as a base, a plurality of cells frames 6's is set in a checked pattern at intervals of one cell size in the X and Y directions so that the cells 2's whose size is determined by the user may be arranged in the vertical and horizontal directions.

Figure 18:
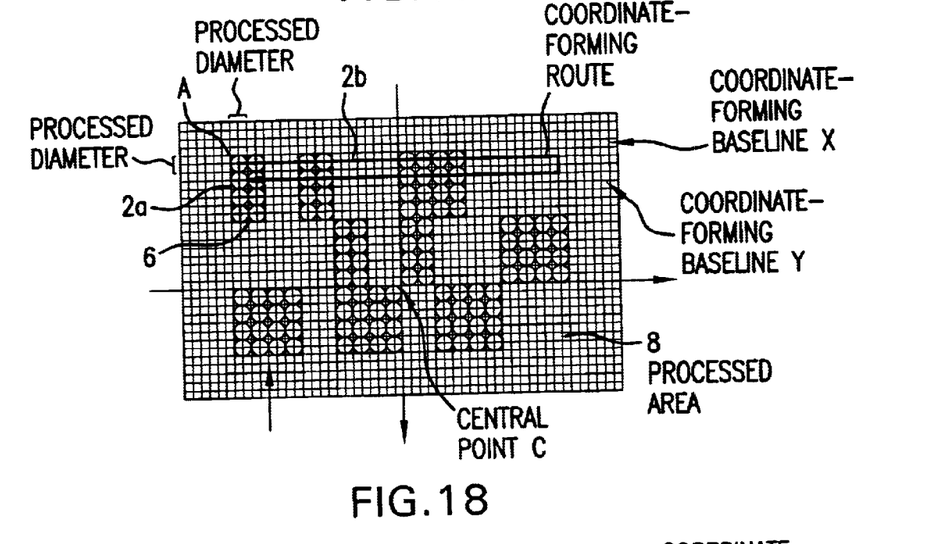
FIG. 18 is an explanatory diagram showing such a state that a cell frame is formed in a processed area and round dots are arranged therein.

It is assumed that the width of one cell (cell width) is an integral multiple of the processed diameter of the round dot 5 to be laser-marked, for example, as shown in FIG. 18, two round dots and four round dots are just contained in the horizontal and vertical directions respectively in one cell. In this case, eight round dots 5's form one cell.

Figure 19:
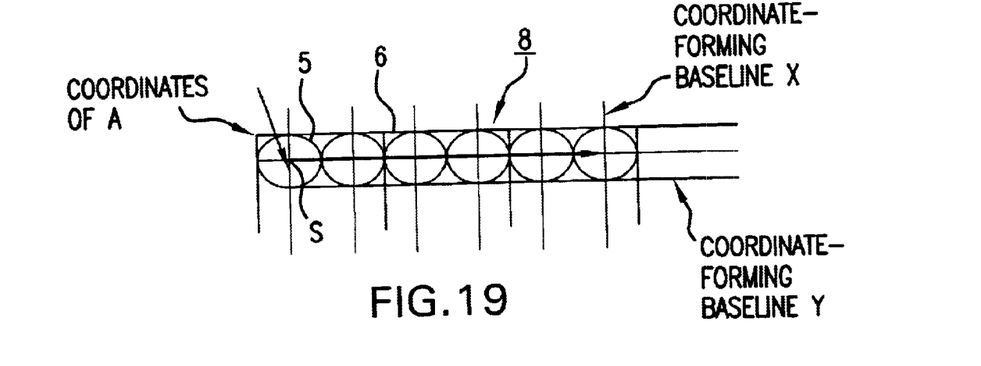
FIG. 19 is an explanatory diagram showing under magnification a corner in the processed area shown in FIG. 18.

Next, with the central point C, which is an intersection of the vertical and horizontal center lines, in the processed area 8 as a base, round dots 5's are arranged in cells 2's. A method for this is as follows. Thus, it is assumed that a position obtained by shifting the coordinate point A, which is the upper left corner of the processed area 8, by process radius of the round dot 5 in X and Y directions respectively toward the inside of the processed area 8 as shown in FIG. 19 is a first beam spot coordinate point S. Furthermore, it is assumed that a line that is parallel to the X-axis and passes over the first beam spot S is a coordinate-forming baseline X. Then, plenty of coordinate-forming baselines X's parallel to this baseline are formed at intervals of the processed diameter of the round dot 5. Similarly, it is assumed that a line that is parallel to the Y-axis and passes over the first beam spot is a coordinate-forming baseline Y. Then, plenty of coordinate-forming baselines Y's parallel to this baseline are formed at intervals of the processed diameter of the round dot 5.

An intersection of the coordinate-forming baseline X and coordinate-forming baseline Y that are formed in this manner becomes a beam spot. Therefore, a coordinate value of an intersection adjacent to the first beam spot S is obtained as a next beam spot coordinate value in the horizontal direction.

This is repeated until beam spot coordinate values are obtained in the entire processed area. In this case, regardless of dark cells 2a's and bright cells 2b's, beam spot coordinate values in the entire processed area are obtained.

Figure 20A:
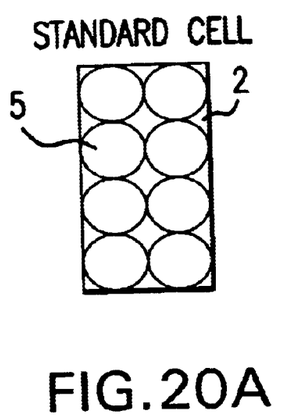
FIG. 20A is an explanatory diagram showing a rectangular standard cell.
Figure 20B:
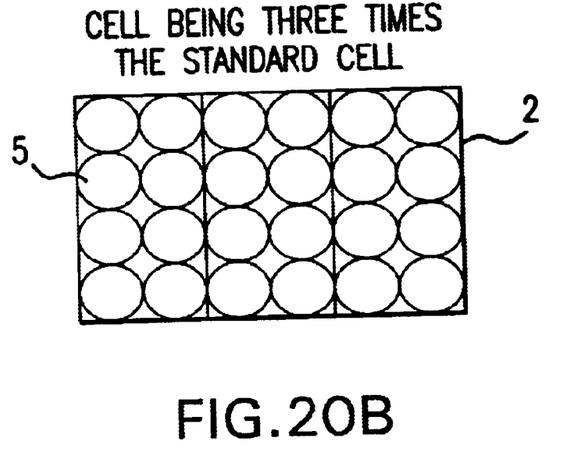
FIG. 20B is an explanatory diagram showing a cell configured by three standard cells.

In addition, the width of the stacked two-dimensional code 1 in the X direction of the cell 2 is not constant. For example, as shown in FIG. 20B, with the cell 2 containing 2 round dots in the horizontal direction and 4 round dots in the vertical direction as a standard cell, another cell 2 just containing 6 round dots in the horizontal direction and 4 round dots in the vertical direction is constituted with arranging a plurality of standard cells, that is, in this case, three standard cells, as shown in FIG. 20A.

Figure 21A:
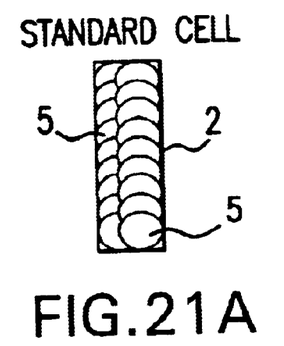
FIG. 21A is an explanatory diagram showing a rectangular standard cell formed with round dots whose gaps are adjusted.
Figure 21B:
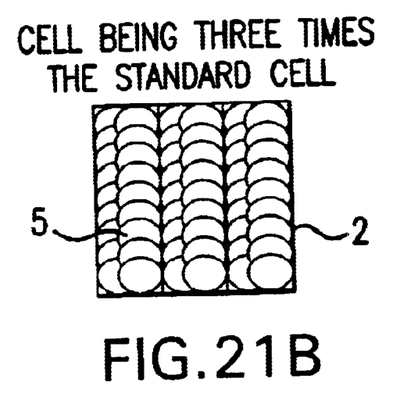
FIG. 21B is an explanatory diagram showing a cell configured by three standard cells shown in FIG. 21A.

Furthermore, as shown in FIG. 21A, for example, it is assumed that the width of one cell is smaller than that of two round dots 5's and its height is smaller than that of nine round dots 5's. Round dots 5's are arranged inside respective corners of the cell frame 6 so that each round dot 5 may be inscribed in the cell frame 6. Next, seven round dots 5's are arranged in equal intervals between the round dots 5's at both corners of the cell frame 6 in the vertical direction. With a cell 2, where round dots 5's are arranged in this manner, as a standard cell, a cell having the width that is three times the width of the standard cell is formed as shown in FIG. 21B. Moreover, if a residual arises because a plurality of round dots 5's cannot be arranged within the width of one cell, the cells 2's are arranged with their intervals being adjusted as shown in FIG. 11 described above.

In this manner, an intersection of the vertical and horizontal centerlines in the processed area 8 is made to be a central point C. With this point as a base, round dots 5's are arranged as shown in FIG. 18. In this case, it is assumed that a position obtained by shifting the coordinate point A, which is the upper left corner of the processed area 8, by the process radius of the round dot 5 in X and Y directions respectively toward the inside of the processed area 8 as shown in FIG. 19 is a first beam spot coordinate point. Furthermore, it is assumed that a line that is parallel to the X-axis and passes over the first beam spot S is a coordinate-forming baseline X. Then, plenty of coordinate-forming baselines X's parallel to this baseline are formed at intervals of the processed diameter of the round dot 5. Similarly, it is assumed that a line that is parallel to the Y-axis and passes over the first beam spot is a coordinate-forming baseline Y. Then, plenty of coordinate-forming baselines Y's parallel to this baseline are formed at the intervals of the processed diameter of the round dot 5.

Next, beam spot coordinates of only the dark cells 2a's are stored in memory from the beam spot coordinates obtained here and the code data in the two-dimensional matrix shown in FIG. 15. Elements of the two-dimensional array of the round dots 5's where beam spot coordinate values are stored are stored in such order that a galvanometer scans the cells 2's. If laser burning is performed on a marking surface with using this process data, which is stored in the memory, as it is, the marking is deformed. Therefore, the process data is corrected by spherical corrective processing so that a finished form may become square.

Figure 16:
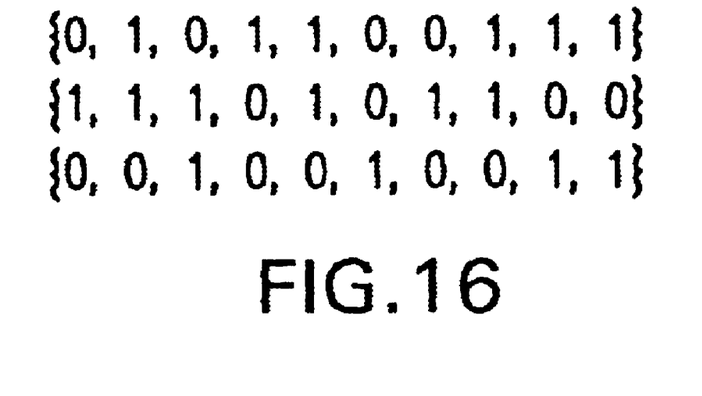
FIG. 16 shows code data arrayed in a two-dimensional matrix whose size is a half of that of the matrix in FIG. 15.
Figure 22:
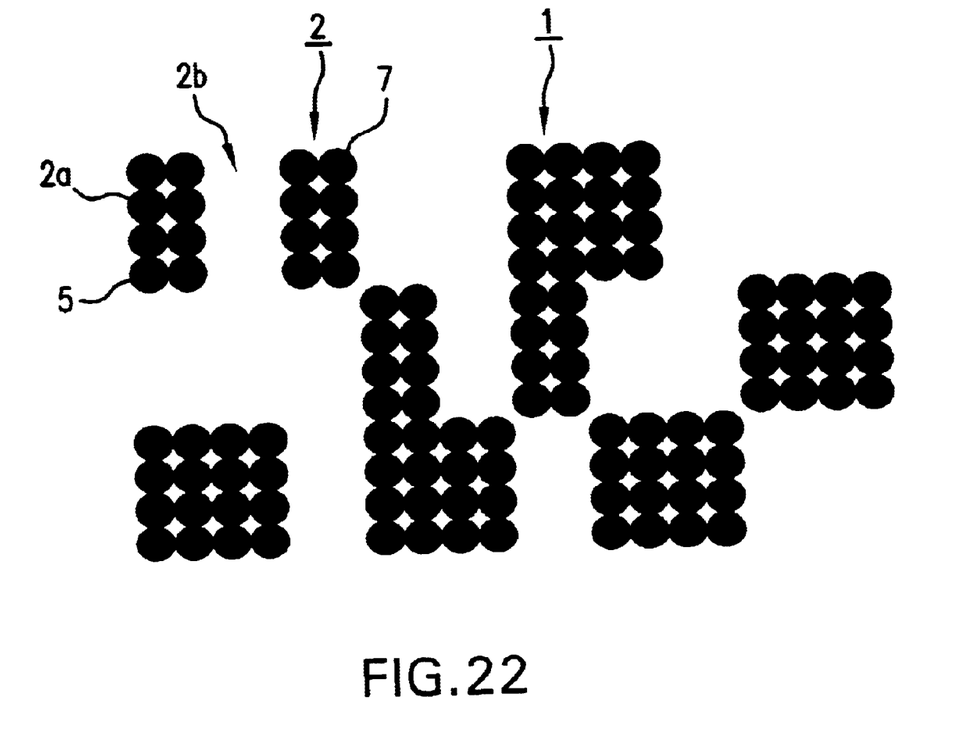
FIG. 22 is a top view showing a stacked two-dimensional code that is laser-marked according to the present invention.

After this, the process data stored in the memory is outputted to a laser marker on the basis of an I/O board specification and a FIFO specification. A laser beam is emitted on the marking surface to form the two-dimensional code 1 shown by dark cells 2a's in FIG. 22. In addition, the cell elements 7's of the cell 2 in the vertical direction is arrayed in the same arrangement along the X-axis. Hence it is possible to replace one cell with one bit by omitting the cell elements 7's in the lower side, reading only the cell elements 7's in the upper side, and storing the cell elements as the code data in the two-dimensional matrix shown in FIG. 16. In this case, when the process data generated from this data is outputted to a laser marker, each row data (in the X direction) can be repeatedly outputted with shifting each row data in the Y direction.

As described above, in accordance with a formation method of a two-dimensional code according to the first aspect of the present invention, one dark or bright cell is transformed into one dot, beam spot coordinates are obtained from this cell data, which is transformed into one bit, and the arrangement of round dots with compose cells, this process data is stored in memory, this is outputted to a laser marker, and then the two-dimensional code with a dark and bright pattern is formed on a marking surface. Therefore, since there is no irregularity such as a runover portion and a blank portion, read precision increases. In particular, this method is effective for forming a small two-dimensional code whose side is 1 mm long.

In addition, in accordance with a formation method of a two-dimensional code according to the second aspect of the present invention, if a bright pattern or dark pattern of a bit map file is configured by rectangular cells each configured by a plurality of bunching square cell elements, each cell is stored as an element of a two-dimensional array having a value of 0 or 1 after reading only one cell element in each cell. Therefore, it is possible to sharply reduce memory capacity.

Furthermore, in accordance with a formation method of a two-dimensional code according to the third aspect of the present invention, in the step of storing in memory the coordinates of beam spots corresponding to centers of respective round dots arranged in a processed area, only beam spot coordinates of dark cells are stored in memory. Therefore, it is possible to further reduce the memory capacity.

Note that the aforementioned disclosure claims the priority of and relates to the subject matter contained in Japanese Patent Application No. 11-019193 filed on Jan. 28, 1999, which is incorporated by reference in this application in its entirety.

What is claimed is:

1. A formation method of a two-dimensional code for forming the two-dimensional code, where dark or bright unit cells are arranged in a matrix, on a marking surface by laser burning, comprising the steps of:

storing a bright or dark cell as an element of a two-dimensional array having a value of 0 or 1 after reading a bit map file;

calculating a number of round dots contained in a cell from the size of one cell to be laser-marked and a processed diameter of a round dot formed by a laser beam according to material processed;

obtaining a processed area from the two-dimensional array, which is stored and is configured by zeroes and ones, and the size of one cell;

setting a plurality of cell frames at intervals of one cell width in the X and Y directions in a checked pattern with a center point of this processed area as a base, arranging the round dots inside corners of the cell frames so that the round dots may be inscribed in the corners and arranging the round dots at equal intervals between the round dots inscribed in the corners, in the vertical and horizontal directions;

storing coordinates of beam spots, which correspond to centers of respective round dots arranged in a processed area, in memory; and outputting this process data stored in the memory to a laser marker and performing laser-marking on the marking surface.

2. The formation method of a two-dimensional code according to claim 1, wherein in the step of storing a bright or dark cell as an element of a two-dimensional array having a value of 0 or 1 after reading a bit map file, if a dark pattern or bright pattern in the bit map file is configured by rectangular cells each of which is configured by a plurality of bunching square cell elements, each cell is stored as an element of a two-dimensional array having a value of 0 or 1 after reading only one cell element in each cell.

3. The formation method of a two-dimensional code according to claim 1, wherein in the step of storing coordinates of beam spots, which correspond to centers of respective round dots arranged in a processed area, in memory, only beam spot coordinates of dark cells are stored in memory.

* * * * *